(12) United States Patent
Blaha et al.

(10) Patent No.: US 8,928,252 B2
(45) Date of Patent: Jan. 6, 2015

(54) VOLTAGE CONVERTER FOR SUPPLYING A SEMICONDUCTOR LIGHT SOURCE, IN PARTICULAR A LED LAMP

(75) Inventors: Karel Blaha, Pilsen (CZ); Jan Milsimer, Pilsen (CZ)

(73) Assignee: STMicroelectronics Design and Application S.R.O., Prague (CZ)

( * ) Notice: Subject to any disclaimer, the term of this patent is extended or adjusted under 35 U.S.C. 154(b) by 1216 days.

(21) Appl. No.: 12/833,280

(22) Filed: Jul. 9, 2010

(65) Prior Publication Data

US 2011/0006691 A1  Jan. 13, 2011

(30) Foreign Application Priority Data

Jul. 10, 2009  (IT) ............................... MI2009A1227

(51) Int. Cl.
*H05B 37/02* (2006.01)
*H02M 7/217* (2006.01)
*H02M 1/00* (2006.01)

(52) U.S. Cl.
CPC .......... *H02M 7/217* (2013.01); *H05M 33/0818* (2013.01); *H02M 2001/007* (2013.01)
USPC ......... 315/294; 315/185 R; 315/291; 315/192

(58) Field of Classification Search
CPC .................... H05B 33/0818; H02M 2001/007; H02M 7/217
USPC .............................. 315/185 R, 291, 294, 192
See application file for complete search history.

(56) References Cited

U.S. PATENT DOCUMENTS

| | | | |
|---|---|---|---|
| 6,577,072 B2 * | 6/2003 | Saito et al. ................ | 315/185 R |
| 7,202,636 B2 * | 4/2007 | Reynolds et al. ............. | 320/166 |
| 7,990,745 B2 * | 8/2011 | Huang et al. .................. | 363/132 |

(Continued)

FOREIGN PATENT DOCUMENTS

WO      2009055821      4/2009

OTHER PUBLICATIONS

Search Report for Italian Application No. ITMI20091227, Ministero dello Sviluppo Economico, Munich, Feb. 23, 2010, pp. 2.

(Continued)

*Primary Examiner* — Jimmy Vu
*Assistant Examiner* — Amy Yang
(74) *Attorney, Agent, or Firm* — Gardere Wynne Sewell LLP

(57) ABSTRACT

An embodiment of the disclosure relates to a voltage converter for supplying a semiconductor light source and having at least an input terminal connected to a power supply reference, namely an AC mains voltage reference, and an output terminal providing a current signal to said semiconductor light source, the converter being also connected to a voltage reference and comprising at least a step-down block inserted between a switching node and to the output terminal and connected to the voltage reference and an input block connected to the input terminal, as well as to a first input node and to a first output node of a control circuit, in turn connected to the switching node and to the voltage reference. The input block is a pre-regulator input block and comprises at least a switching component connected to the input terminal and to a capacitive block, in turn inserted between a second input node of the control circuit and the voltage reference, such a switching component having a control terminal connected to the first output node.

37 Claims, 4 Drawing Sheets

(56) References Cited

U.S. PATENT DOCUMENTS

2001/0043113 A1    11/2001   Hoshino et al.
2005/0040421 A1    2/2005    Wu
2007/0108916 A1*   5/2007    Wang et al. .................. 315/247

OTHER PUBLICATIONS

M. Kosteva "Light Bulb Replacement", Texas Instruments, Mar. 27, 2009, pp. 2.

SSL2102, "Mains LED driver IC for dimmable LED lighting" Product data sheet, Rev.01—Jun. 29, 2009, NXP founded by Philips, pp. 21.

C. K. Tse, S. C. Wong and M. H. L. Chow, "The Simplest Lossless Switched-Capacitor AC/DC Converter", Power Electronics Specialists Conference, Pesc '94 record, 25th Annual IEEE Taipei, Taiwan Jun. 20-25, 1994, pp. 1212-1217, XP010121370, ISBN: 978-0-7803-1859-5.

* cited by examiner

VOLTAGE CONVERTER FOR SUPPLYING A SEMICONDUCTOR LIGHT SOURCE, IN PARTICULAR A LED LAMP

PRIORITY CLAIM

The instant application claims priority to Italian Patent Application No. MI2009A001227, filed Jul. 10, 2009, which application is incorporated herein by reference in its entirety.

TECHNICAL FIELD

An embodiment of the present disclosure relates to a voltage converter for supplying a semiconductor light source.

More specifically, an embodiment of the disclosure relates to a voltage converter for supplying a semiconductor light source and having at least an input terminal coupled to a power supply reference, namely an AC mains voltage reference, and an output terminal providing a current signal to said semiconductor light source, the converter being also coupled to a voltage reference and comprising at least a step-down block inserted between a switching node and to said output terminal and coupled to said voltage reference and an input block coupled to said input terminal, as well as to a first input node and to a first output node of a control circuit, in turn coupled to said switching node and to said voltage reference.

BACKGROUND

As it is well known, a LED (acronym from: "Light-Emitting Diode") is an electronic light source based on a semiconductor diode. When the diode is forward biased or switched on, electrons are able to recombine with holes and energy is released in the form of light, according to the electroluminescence effect, the colour of the light being determined by the energy gap of the semiconductor material composing the diode, i.e., the LED.

A LED lamp usually comprises clusters of LEDs in a suitable housing, arranged according to different shapes, such as a standard light bulb shape.

In particular, in the lighting field, some strongly feel the need of replacing standard lamps, such as classical incandescent bulb lamps, with semiconductor light sources, in particular LED lamps, LEDs presenting many advantages over traditional light sources including lower energy consumption, longer lifetime, improved robustness, smaller size, and faster switching time. Such a replacement is namely recommended, e.g., in lighting apparatuses for bars, hotels, and other commercial sites requiring a constant lighting over long periods of time.

However, LED lamps may require more precise current and heat management than traditional light sources, and a main challenge is the huge ratio between the forward voltage required by the LEDs of such lamps and the AC mains voltage supplying the lighting apparatus.

AC LED lamps are thus usually driven by an appropriate driving circuit, which substantially comprises a converter and usually employs at least a transformer.

Different solutions for a driving circuit of this type are commonly used, aiming to correctly supply LEDs from an AC mains voltage reference.

A first very simple solution is that of using a so called step-down or buck converter, as schematically shown in FIG. 1, globally indicated at 1.

The buck converter 1 has a first I1 and a second input terminal I2 connected to the AC mains, and a first O1 and a second output terminal O2 connected to a semiconductor light source, in particular a LED lamp LL.

The buck converter 1 comprises a PWM controller 2 connected to the first input terminal I1 by means of a resistive path, namely a series of a first R1 and a second resistor R2, as well to a voltage reference, namely a ground GND, by means of a first capacitor C1. The PWM controller 2 also has an output node Xout connected to a control or gate terminal of a transistor M1, in particular a Power MOS transistor, in turn inserted between a first internal circuit node X1 and ground GND.

Moreover, the first internal circuit node X1 is connected to the first output terminal O1 of the buck converter 1 by means of a Zener diode DZ as well as to the second output terminal O2 of the buck converter 1 by means of a filtering inductor L1.

The buck converter 1 also comprises a rectifier bridge 3 being connected to the first and second input terminals, I1 and I2, as well as to a second and a third internal circuit node, X2 and X3. The second internal circuit node X2 is also connected to the first output terminal O1 of the buck converter 1 and to the third internal circuit node X3 by means of a second capacitor C2, the third internal circuit node X3 being in turn connected to ground GND.

The operation of a buck converter is fairly simple, with two switching elements (namely the transistor M1 and the Zener diode DZ) that alternatively connect the filtering inductor L1 to the power supply reference to store energy and discharge it into the load, i.e., the LED lamp LL.

By using a buck converter 1 of this type, a driving circuit is obtained which shows a very good efficiency of conversion and which is thus mainly suitable for driving LEDs. However, when the difference between the rectified AC mains voltage and a forward or supply voltage (VFLEDs) to be provided to the LEDs of the LED lamp LL is relatively big, the efficiency of this known buck converter 1 falls abruptly.

Also, the filtering inductor L1 is not small and the area required by the buck converter 1 as a whole is thus medium, the same working with a switching frequency in the range of 100 kHz.

In view of all its features, a buck converter 1 of this type can thus provide a driving circuit for a semiconductor light source, in particular a LED lamp, having a medium cost.

An other solution is that of using a so called fly-back converter, as schematically shown in FIG. 2, globally indicated with 5.

In particular, the fly-back converter 5 has a first IN1 and a second input terminal IN2 connected to the AC mains, and an output terminal OUT1 connected to a semiconductor light source, in particular a LED lamp LL, in turn connected to a feedback node X7, whereat a feedback voltage VFB is applied. The current flowing through the LED lamp LL is sensed as a voltage drop on a resistor R8, which is connected between the feedback node X7 and a ground GND.

The fly-back converter 5 comprises a fly-back controller 6 having a first input node X5 being connected to the input terminal IN by means of a resistive path, namely by a series of a first and a second resistor, R5 and R6, as well as to ground GND, by means of a first capacitor C5, and a second input node X6 connected to an optocoupler 7, in turn connected to ground GND.

In particular, the optocoupler 7 comprises an emitting diode LED and a phototransistor PT, separated so that light may travel through a barrier but an electrical current may not. When an electrical signal is applied to the input of the optocoupler 7, i.e., to the second input node X6, the phototransistor PT switches on and the emitting diode LED lights and a corresponding electrical signal is generated at the output of the optocoupler 7, i.e., to the feedback node X7. Such a feedback node X7 is also connected to the resistor R8, which is used to sense the current flowing through the LED lamp LL.

The fly-back converter 5 further comprises a transformer 8, having a first, a second and a third winding, TR1, TR2 and TR3. In particular, the first winding TR1 is inserted between a second internal circuit node X8 and a second input node X9 of the fly-back controller 6 and it is coupled to the second and third windings, TR2 and TR3 of the transformer 8. The second internal circuit node X6 is also connected, by means of a second capacitor C6, to ground GND.

Moreover, the second winding TR2 is connected to the output terminal OUT1 of the fly-back converter 5 by means of a first diode D1 and to ground GND, a second capacitor C7 being also connected between the output terminal OUT1 and ground GND.

The third winding TR3 is connected to the first input node X5 of the fly-back controller 6 by means of a second diode D2 and to ground GND, the first capacitor C5 being connected in parallel to such a third winding TR3 between the first input node X5 and ground GND.

Finally, the fly-back converter 5 comprises a rectifier bridge 9 connected to the first and second input terminals, IN1 and IN2, of the fly-back converter 5, to the second internal circuit node X8 and to ground GND.

It should be noted that the fly-back converter 5 is able to reduce the large ratio between the AC mains voltage and the forward or supply voltage (VFLEDs) to be provided to the LEDs of the LED lamp LL, essentially thanks to the transformer 8.

However, this solution is relatively complex, mainly due to the presence of the transformer 8.

Advantages of this known fly-back converter are a very good efficiency of conversion, a wide range of the forward voltage (VFLEDs) for the LEDs, and a wide range of output currents, working with a switching frequency in the range of 100 kHz.

Moreover, the fly-back converter 5 is able to insulate the LED lamp LL from the AC mains in case of breakdown, thanks to the transformer 8 and to the optocoupler 7.

However, the fly-back converter 5 has a fairly high number of components, the biggest ones being the transformer 8, the rectifier bridge 9, the fly-back controller 6 and the optocoupler 7. So, this solution also has many drawbacks, namely high costs, a high area occupation and a high complexity.

SUMMARY

An embodiment of the present disclosure is an AC-DC converter, having structural and functional characteristics which allow to minimize the number of components to be used as well as the complexity of the converter as a whole, and thus its cost, while ensuring correctly supplying a semiconductor light source, in particular using LEDs, in this way overcoming at least some of the limits and drawbacks which still affect the converters realized according to the prior art.

An embodiment of the present disclosure pre-regulates the AC mains voltage in order to reduce the ratio between input and output voltage values for the converter, being in the form of a step-down DC/DC converter, and thus avoiding the need of using a transformer.

Such an embodiment includes a voltage converter for supplying a semiconductor light source and having at least an input terminal connected to a power supply reference, namely an AC mains voltage reference, and an output terminal providing a current signal to said semiconductor light source, the converter being also connected to a voltage reference and comprising at least a step-down block inserted between a switching node and to said output terminal and connected to said voltage reference and an input block connected to said input terminal, as well as to a first input node and to a first output node of a control circuit, in turn connected to said switching node and to said voltage reference. Said input block is a pre-regulator input block and comprises at least a switching component connected to said input terminal and to a capacitive block, in turn inserted between a second input node of said control circuit and said voltage reference, said switching component having a control terminal connected to said first output node.

According to an embodiment of the disclosure, said capacitive block comprises a plurality of capacitors inserted in parallel to each other between said second input node and said voltage reference and provides for a pre-regulation of a voltage value applied to said input terminal of the voltage converter.

According to another embodiment of the disclosure, said control circuit further comprises a supplying pre-regulation block which is directly connected to a third input node and is also connected to said first input node by means of a regulation diode, said first input node being also connected to said voltage reference by means of a regulation resistor, said supplying pre-regulation block stabilizing a voltage value at said first input node when a voltage value on said second input node coming from said pre-regulator input block is under a predefined first threshold value, while, when said voltage value on said second input node is higher than said predefined first threshold value, said supplying pre-regulation block cuts a supplying from said first input node and switches a supply path of said control circuit to said second input node.

According to yet another embodiment of the disclosure, said control circuit further comprises a gate driver block connected to said first output node as well to said first input node and able to drive said control terminal of said switching component in such a way that said voltage value in absolute value on said second input node is always between a second and a third predetermined threshold values.

Moreover, according to an embodiment of the disclosure, said control circuit further comprises a synchronization block connected to said gate driver block and synchronizing the latter with said supply voltage reference to optimize the current consumption.

According to another embodiment of the disclosure, said control circuit further comprises a step-down driver block connected to said second input node and to said switching node of said step-down block and able to convert said voltage value on said second input node, which has a relatively large ripple and comes from said pre-regulator input block, to a voltage value on said switching node, which has a relatively low ripple and is suitable to be applied to said step-down block for the supplying of said semiconductor light source.

According to an embodiment of the disclosure, said step-down driver block has a high value switching frequency, for example, equal to 1.8 Mhz.

Moreover, according to an embodiment of the disclosure, said step-down driver block has an input terminal connected to a logic block, in turn connected to a locking block, said logic block driving said step-down driver block according to an internal state-machine to guarantee a proper operation of said control circuit, and said locking block stopping the operation of said control circuit when a voltage value being detected on a third input node of said control circuit is under a lockout voltage value.

According to another embodiment of the disclosure, said control circuit further comprises a comparative block, in turn including at least:
- a comparator, having an output node connected to said logic block, a first input node receiving a sawtooth signal and a second input node;
- an integrator, having an output node connected to said second input node of said comparator, a first input node connected, by means of a feedback capacitor, to said output node and a second input node; and
- an operational amplifier, having an output node connected to said second input node of said integrator, a first input node connected to a feedback terminal of said control circuit and a second input node.

Moreover, according to this embodiment of the disclosure, said control circuit further comprises a dimming block connected to said second input node of said operational amplifier of said comparative block, to a fourth input node of said control circuit and to a peak detection block, in turn connected to said first input node of said control circuit, said peak detection block detecting peak voltage values on said supply voltage reference by detecting a voltage value on said first input node, in turn connected to said input terminal of the converter and reconstructing the RMS or Root mean square value of said supply voltage reference, providing it to said dimming block, which works with the information coming from said peak detection block and from said fourth input node.

According to an embodiment of the disclosure, said pre-regulator input block further comprises a fuse component inserted between said input terminal and said switching component and having a control terminal connected to a second output node of said control circuit.

Moreover, according to another embodiment of the disclosure, said pre-regulator input block further comprises a resistive path, in turn including a first and a second resistor, inserted, in series to each other, between an intermediate node between said fuse component and said switching component, and said first input node of said control circuit.

According to yet another embodiment of the disclosure, said control circuit further comprises a protection block connected to said second output node of said control circuit and able to drive said fuse component of said pre-regulator input block to protect said semiconductor light source connected to said voltage converter as well as an user thereof from high voltage values of said supply voltage reference, said protection block being able to detect any failure on said supply voltage reference during its normal working or during the assembly/manufacturing of said voltage converter.

According to another embodiment of the disclosure, said third input node of said control circuit is connected to said voltage reference by means of a capacitor.

According to yet another embodiment of the disclosure, said fourth input node is connected to a sensor, for example, an infrared wireless sensor.

Moreover, according to a further embodiment of the disclosure, said step-down block comprises an inductor and a capacitor, said inductor being inserted between said switching node and said output terminal and said capacitor being inserted between said output terminal and said voltage reference.

According to an embodiment of the disclosure, said control circuit is integrated in one single chip, the whole voltage converter being a system on a chip.

According to an embodiment of the disclosure, power devices associated to said control circuit are also integrated in said one single chip.

Moreover, also according to an embodiment of the disclosure, said power devices comprises at least said fuse component and said switching component.

An embodiment includes a lighting apparatus comprising a semiconductor light source connected to an output terminal of a voltage converter as previously defined.

According to an embodiment of the disclosure, said semiconductor light source comprises at least one LED.

According to another embodiment of the disclosure, said semiconductor light source comprises a LED lamp, in turn including a plurality of LEDs.

An embodiment includes a method for supplying a semiconductor light source starting from a power supply reference, namely an AC mains voltage reference to provide a current signal to said semiconductor light source, the method comprising the steps of:
- preregulating said power supply reference into a preregulated voltage signal by means of a capacitive block which decreases the power supply reference voltage to said preregulated voltage signal;
- converting said preregulated voltage signal, which has a big ripple, into a switching voltage which has a very low ripple and is suitable to be applied to a step-down block for the supplying of said semiconductor light source; and
- feeding back said preregulated voltage signal (VPREREG) by suitably driving a switching component connected to said capacitive block.

According to an embodiment of the disclosure, the method further comprises a step of cutting the supply from said power supply reference when said pre-regulated voltage signal is higher than a predefined first threshold value and switching the supply path in such a way to use said pre-regulated voltage signal.

According to another embodiment of the disclosure, the method further comprises a step of driving said switching component in such a way that the voltage value in absolute value of said pre-regulated voltage signal is always between a second and a third predetermined threshold values.

According to yet another embodiment of the disclosure, said step of driving said switching component is synchronized with said power supply reference.

According to a further embodiment of the disclosure, the method further comprises a step of stopping the supplying when a control voltage value is under a lockout voltage value.

Moreover, according to another embodiment of the disclosure, the method further comprises a step of detecting a peak voltage value on said power supply reference and reconstructing the RMS (Root mean square) value of said power supply reference.

According to an embodiment of the disclosure, the method further comprises a step of dimming said current signal provided to said semiconductor light source according to the value of said power supply reference and to an external dimming signal.

BRIEF DESCRIPTION OF THE DRAWINGS

Characteristics and advantages of a converter according to one or more embodiments of the disclosure will be apparent from the following description given by way of indicative and non limiting example with reference to the annexed drawings. In such drawings.

DETAILED DESCRIPTION

Figure 1:
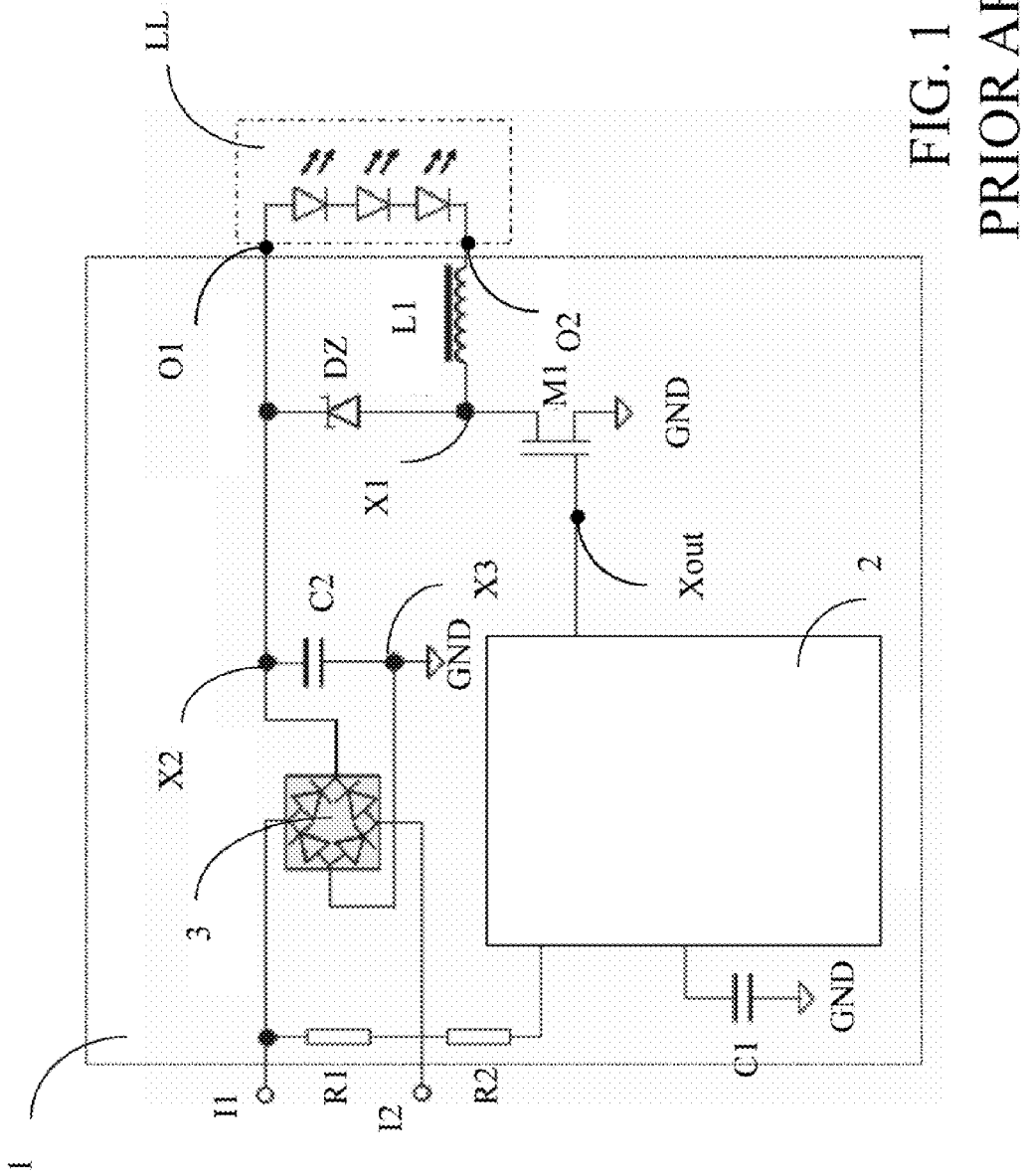
FIG. 1 schematically shows a conventional buck converter.
Figure 2:
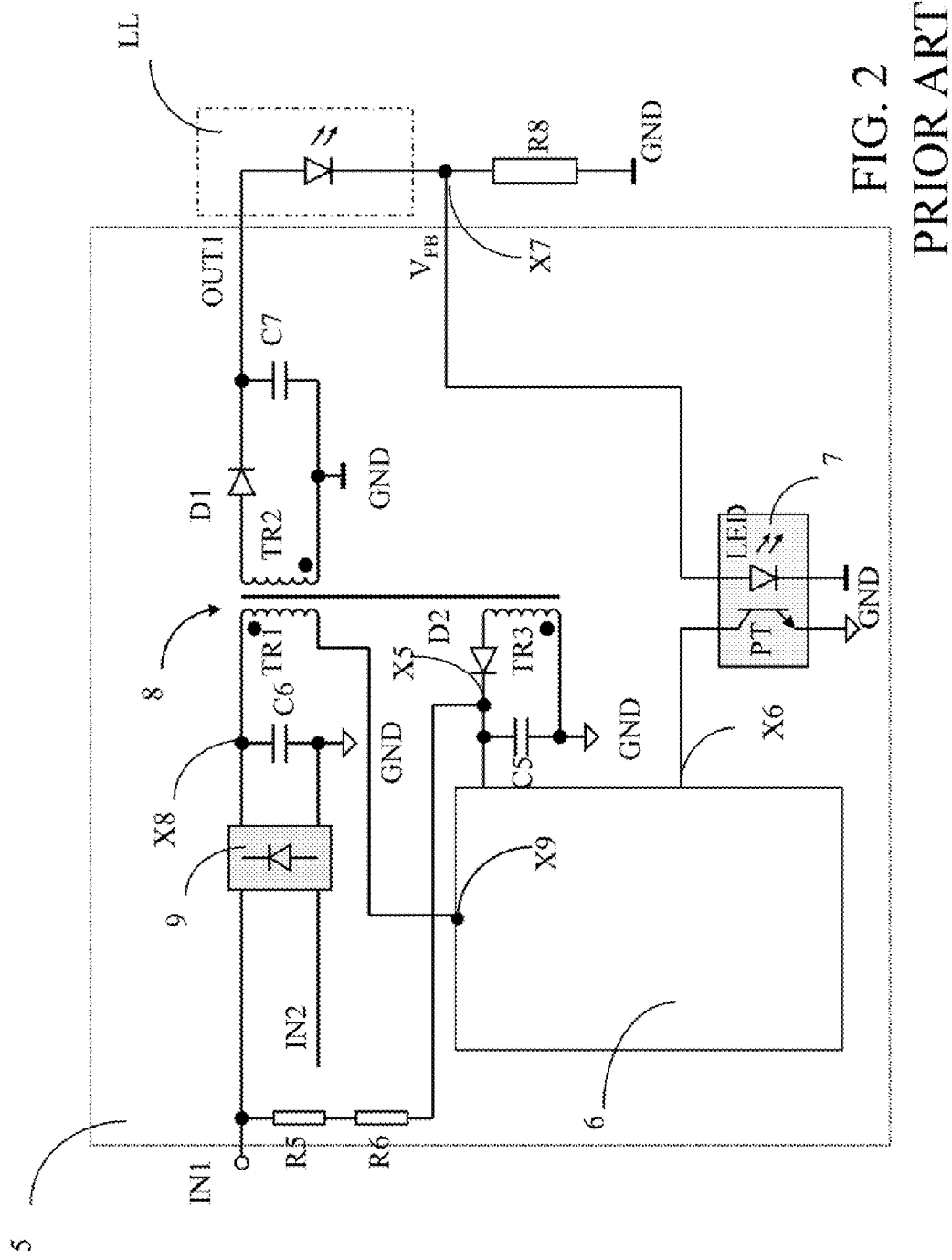
FIG. 2 schematically shows a conventional fly-back converter.
Figure 3:
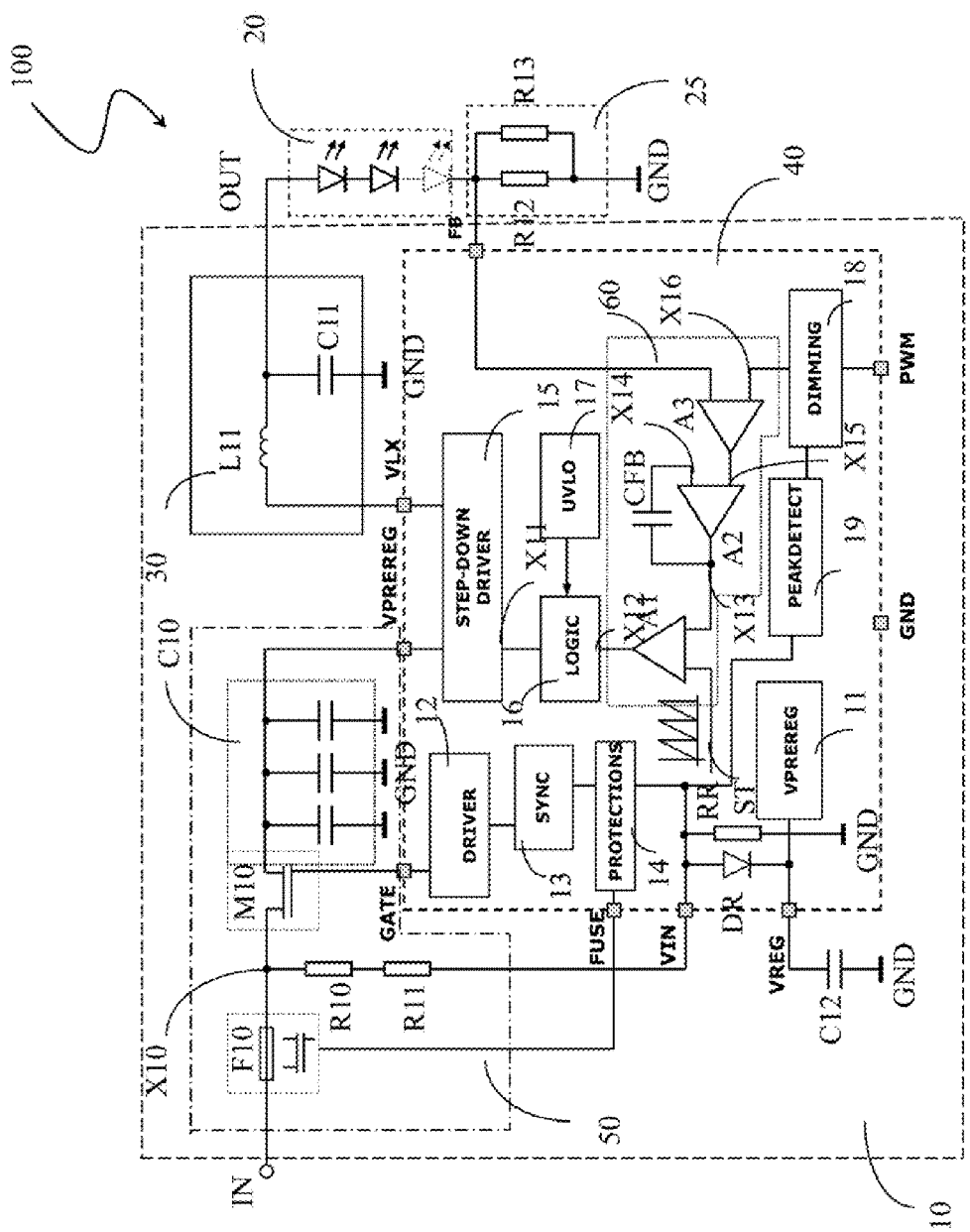
FIG. 3 schematically shows a lighting apparatus comprising an AC-DC converter of the step-down type which supplies a semiconductor light source, in particular a LED lamp, realized according to an embodiment of the present disclosure, and FIG. 4 schematically shows the converter of FIG. 3 in the form of an embodiment of a system on a chip.

With reference to such figures, and in particular to FIG. 3, an embodiment of a lighting apparatus comprising a semiconductor light source, in particular a LED lamp, is schematically shown, globally indicated with 100.

The lighting apparatus 100 comprises a converter 10, in particular an AC-DC voltage converter, having an input terminal IN connected to a power supply reference, in particular to the AC mains, and an output terminal OUT connected to a semiconductor light source 20. The converter 10 is also connected to a voltage reference, in particular a ground GND.

More in particular, the converter 10 is a step-down or buck converter and comprises a step-down block 30 inserted between a switching node VLX and the output terminal OUT of the converter 10 and connected to ground GND Here and in the rest of the description, same reference labels will be used to indicate a circuit node and a corresponding voltage signal applied thereon.

The step-down block 30 comprises an inductor L11 and a first capacitor C11. In particular, the inductor L11 is inserted between the switching node VLX and the output terminal OUT while the first capacitor C11 is inserted between the output terminal OUT and ground GND.

The converter 10 comprises a control circuit 40 being connected to the switching node VLX of the step-down block 30 and being suitable to be integrated in one single package in the form of a SiP (acronym for "System in Package") or SOC (System on a Chip), as will be more clearly explained in the following description. Moreover, as will be also clarified, the power devices of the converter 10 may be integrated in such one single package too.

The semiconductor light source 20 is further connected to ground GND by means of a resistive block 25, comprising two resistors, R12 and R13, which are connected, in parallel to each other, between a feedback terminal FB of the control circuit 40 and ground GND, such feedback terminal FB being also connected to the semiconductor light source 20.

The converter 10 further comprises an input block 50 connected to the input terminal IN and in turn comprising at least a fuse component F10 and a switching component M10, for instance a power MOS transistor, such power devices being able to be integrated in one single package along with the control circuit 40.

The input block 50 further comprises a resistive path, in turn including a first and a second resistor, R10 and R11, which are inserted, in series to each other, between a first internal circuit node X10, being the intermediate node between the fuse component F10 and the switching component M10, and a first input node VIN of the control circuit 40. The fuse component F10 and the switching component M10 are inserted, in series to each other, between the input terminal IN of the converter 10 and a second input node VPREREG of the control circuit 40.

Moreover, the input block 50 comprises a capacitive block, globally indicated as C10, inserted between the second input node VPREREG of the control circuit 40 and ground GND and connected to the switching component M10. In particular, the capacitive block C10 comprises a plurality of capacitors inserted, in parallel to each other, between the second input node VPREREG and ground GND.

A first output node GATE of the control circuit 40 is connected to a control or gate terminal of the switching component M10 and a second output node FUSE of the control circuit 40 is connected to a control terminal of the fuse component F10.

In particular, the input block 50 provides for a preregulation of the input voltage, in particular the AC mains voltage, to be applied to the second input node VPREREG of the control circuit 40, the same providing for a loop control of such a preregulated voltage by suitably driving the switching on of the switching component M10 and thus the supplying of the capacitive block C10.

Namely, the capacitive block C10 provides for a pre-regulation of the AC mains voltage, by decreasing the voltage (e.g., 230VAC or 110VAC) on the input terminal IN to the approximate 30V on the second input node VPREREG.

A third input node VREG of the control circuit 40 is also connected to ground GND by means of a second capacitor C12, while a fourth input node PWM of the control circuit 40 is supplied with a PWM signal, in particular from an infrared wireless sensor associated with the lighting apparatus 100.

The control circuit 40 comprises a supplying pre-regulation block 11, being connected to the third input node VREG as well as to the second input node VPREREG (not shown in FIG. 3 for sake of simplicity) and being also connected to the first input node VIN by means of a regulation diode DR. The first input node VIN is also connected to ground GND by means of a regulation resistor RR.

More in detail, the supplying pre-regulation block 11 provides for a loop path of the preregulated voltage obtained downstream of the pre-regulator input block 50 at the second input node VPREREG of the control circuit 40. During start up, for example, when there may not be sufficient voltage on the second input node VPREREG coming from the pre-regulator input block 50, the supplying pre-regulation block 11 is stabilizing a voltage value at the first input node VIN, which is connected to the supplying pre-regulation block 11 by means of the regulation diode DR and is also connected to the AC mains at the input terminal IN of the converter 10 through the regulation resistor RR in turn connected to ground GND. When the VPREREG voltage is higher than a predefined first threshold value, for instance 10V, the supplying pre-regulation block 11 cuts the supplying from the AC mains at the first input node VIN and switches the supply path to the second input node VPREREG to improve the efficiency of the converter 10 as a whole.

The control circuit 40 further comprises a gate driver block 12 (DRIVER) connected to the first output node GATE as well to the first input node VIN through the series of a synchronization block 13 (SYNC) and a protection block 14 (PROTECTIONS), the latter also being connected to the second output node FUSE.

More in detail, the gate driver block 12 drives the gate terminal of the switching component M10 in such a way that the steady-state voltage value in absolute value on the second input node VPREREG is maintained between a second and a third predetermined threshold values, for example, between 25V and 35V, thanks to the correct supplying of the capacitive block C10. The gate driver block 12 may be synchronized with the AC mains voltage by means of the synchronization block 13 to provide an optimized current consumption (e.g., suitable power-factor) and also to keep the voltage on second input node VPREREG in the desired voltage range. For example, the gate driver block 12 may activate M10 only while the AC mains voltage has a value within a range, for example, between 25V and 35V (and also between −25V and −35V if the converter 10 includes a full-wave rectifier (not shown in FIG. 3)). Or, the gate driver block 12 may activate M10 whenever the AC mains voltage has a value above a voltage, for example, 25V (and also below −25V if the converter 10 includes a full-wave rectifier). Alternatively, the converter 10 may include an inductor (not shown) coupled to M10 to form a power-factor-correction circuit that can provide current to the capacitor bank C10 during approximately the entire cycle of the AC mains voltage.

Also, the protection block 14 drives the fuse component F10, being a mechanical or electronic fuse, to protect the lighting apparatus 100, the LEDs of the semiconductor light source 20 and a user thereof from high voltage values on the AC mains.

The control circuit 40 also comprises a step-down driver block 15 connected to the second input node VPREREG of the control circuit 40 and to the switching node VLX of the step-down block 30. The step-down driver block 15 has an input terminal X11 connected to a logic block 16, in turn connected to a locking block 17 (UVLO) as well as to a comparative block 60.

More in particular, the comparative block 60 comprises a comparator A1, having an output node X12 connected to the logic block 16, a first input node ST receiving a sawtooth signal and a second input node X13 connected to an output node of an integrator A2, and having a first input node X14 connected, by means of a feedback capacitor CFB, to its output node X13 and a second input node X15 connected to an operational amplifier A3.

The operational amplifier A3 has a first input node connected to the feedback terminal FB of the control circuit 40 and a second input node X16 connected to a dimming block 18.

The operational amplifier A3 provides an error signal for the integrator A2. The error signal is higher the bigger is the difference between the voltages on the nodes X16 and FB. The output of the integrator A2 is coupled to the comparator A1, which compares it to the sawtooth signal and produces a control signal for the logic block 16.

Moreover, the dimming block 18 is connected to a fourth input node PWM of the control circuit 40 and to a peak detection block 19, in turn connected to the first input node VIN of the control circuit 40.

More in detail, the step-down driver block 15 converts the voltage signal VPREREG, which has a relatively big ripple, for example, in the range of 10V P-P and comes from the pre-regulator input block 50, to the voltage signal VLX, which has a relatively low ripple, for example, in the range of tens of mV, and is suitable to be applied to the step-down block 30 for the supplying of the semiconductor light source 20, being in particular suitable to supply LEDs.

The switching frequency of the step-down driver block 15 may be chosen as having a high value, for instance 1.8 Mhz (a suitable range being, for example, from approximately 1 to 2 MHz), the efficiency of the conversion thus being relatively high, for example up to approximately 95%.

High switching frequency of the step-down driver block 15 allows the use of very small and cheap external components, in particular for the step-down block 30, compared with the known solutions.

In an embodiment, the size of the inductor L11 is 4×4×1.2 mm and the size of the capacitor C11 is a 0603 (0.6 mm×0.3 mm) or 0805 (0.8 mm×0.5 mm) package.

In this way, instead of the heavy transformer of the fly-back converter solution, the converter 10 may use only a small inductor. Generally, the area occupation of a transformer is, for example, about 2000 mm$^3$, while an inductor occupies, for example, only about 20 mm$^3$, the overall area occupation of the converter 10 being thus significantly reduced with respect to a known fly-back converter.

Moreover, thanks to the high switching frequency of the step-down driver block 15, and thus of the converter 10, the lighting of the semiconductor light source 20, in particular of the LEDs comprised therein, may be flicker free.

As already pointed out, the capacitive block C10 provides for a pre-regulation of the AC mains voltage, by decreasing a mains voltage, for example, 230VAC, on the input terminal IN to a lower voltage, for example, approximately 30V, on the second input node VPREREG. Such a pre-regulation is done with a relative big ripple, for example, in the range of approximately 10V at, for example, 50 Hz frequency, on the filtering capacitors of the capacitive block C10.

The voltage value VPREREG is then issued to the very fast and efficient step-down block 30, which regulates of the output current at the output terminal OUT of the converter 10 with relatively minimal losses. For example, the block 30 may include a DC-DC converter or a filter.

In this way, the lighting apparatus 100 comprising the converter 10 may be immune to the flicker effect, since the filtering capacitors of the capacitive block C10 are able to supply the step-down block 30 for a large portion, for example approximately, 80%, of the period of the AC mains even in the case of insufficient voltage on the AC mains.

Moreover, by using a basic clock of 1.8 MHz for the converter 10, a circuit being able to very quickly react to any event on the AC mains voltage is obtained, the converter 10 providing an efficient protection for the semiconductor light source 20 connected to the output terminal OUT and for the control circuit 40 itself.

In particular, the protection block 14 is able to detect a failure, which may happen on the AC mains or during the assembly/manufacturing of the bulb replacement component.

Moreover, the logic block 16 drives the step-down driver block 15 according to an internal state-machine to provide a proper function of the control circuit 40 by preventing it from hanging, while the locking block 17 stops the operation of the control circuit 40, and thus of the lighting apparatus 100, when the voltage value being detected on the third input node VREG is under a lockout voltage value. That is, the voltage on the third input node VREG is below the under-voltage lockout threshold, the operation of the apparatus 100 is stopped.

Furthermore, the peak detection block 19 detects a peak voltage value on the AC mains by detecting the voltage value on the first input node VIN, in turn connected to the input terminal IN of the converter 10, such a detection being completed within a selected time frame. Moreover, the peak detection block 19 reconstructs the RMS (root mean square) value of the AC mains with some tolerance and provides it to the dimming block 18.

The dimming block 18, working with the information coming from the peak detection block 19 and from the fourth input node PWM, is able to dim the current on the output terminal OUT, which is supplied to the semiconductor light source 20, in the range of, for example, an approximately 10 to 100%, according to the AC mains voltage value.

In particular, the fourth input node PWM may be used, for instance, for an infrared wireless sensor associated with the lighting apparatus 100.

Figure 4:
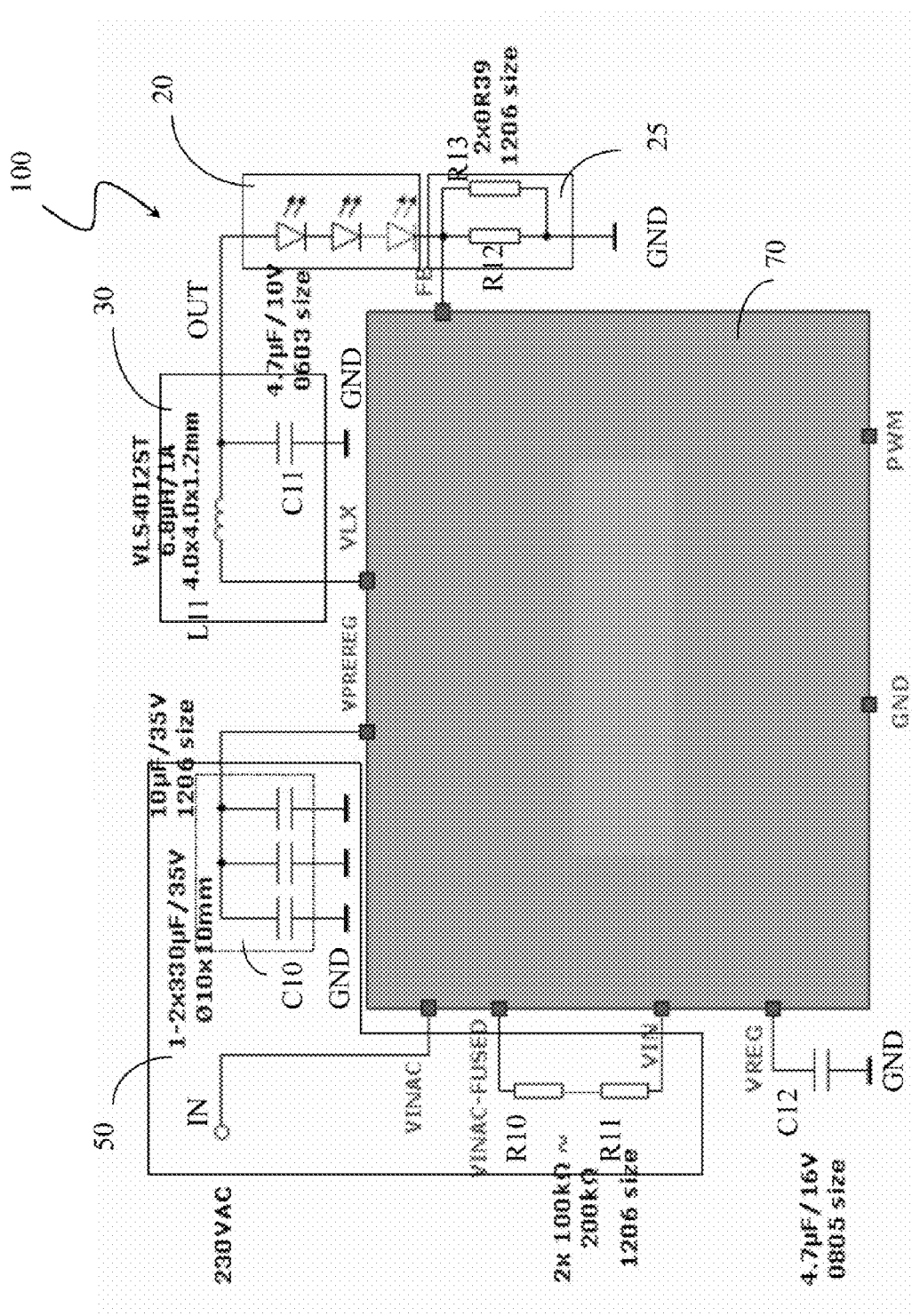

The control circuit 40 and the power devices, namely the fuse component F10 and the switching component M10, may be integrated in one chip, the whole converter 10 being thus obtainable in the form of a System in Package or SiP or a SOC, as shown in FIG. 4. Namely, the converter 10 includes an integrated control circuit 40, comprising a step-down driver, in one package, globally indicated at 70.

In an embodiment of the disclosure, an integrated mechanical/electronic fuse 100 mA/150 ms F10 is used, along with a step-down block 30 having a switching frequency of 1.8 MHz, thus obtaining a step-down converter with a high efficiency of up to 95%, able to drive LEDs in series with a total power up to 7 W, by using modern electrolytic capacitors 330 uF/35V for the capacitive block C10 of the pre-regulator input block 50, such electrolytic capacitors having reduced dimensions (equal to ø10 mm*10 mm), thus providing a converter 10 having an overall small size.

Also an embodiment of a method for supplying a semiconductor light source 20 starting from a power supply reference, namely an AC mains voltage reference is also provided. In particular, the method provides a current signal to the semiconductor light source 20 and comprises the steps of:

preregulating the power supply reference into a preregulated voltage signal, in particular the voltage value VPREREG at the second input node by means of the capacitive block C10, which decreases the power supply reference voltage to the preregulated voltage signal VPREREG;

converting the preregulated voltage signal VPREREG, which has a relatively large ripple, into a switching voltage which has a relatively low ripple and is suitable to be applied to the step-down block 30 for the supplying of the semiconductor light source 20; and feeding back the preregulated voltage signal VPREREG by suitably driving the switching on of a switching component M10 connected to the capacitive block C10.

The method may further comprise one or more of the following steps of:

cutting the supplying from the power supply reference when the pre-regulated voltage signal VPREREG is higher than a predefined first threshold value and switching the supply path in such a way to use the pre-regulated voltage signal VPREREG at the second input node;

driving the switching component M10 in such a way that the voltage value in absolute value of the pre-regulated voltage signal VPREREG is between a second and a third predetermined threshold values;

stopping the supplying of current to the LEDs 20 when a control voltage value is under a lockout voltage value;

detecting a peak voltage value on the power supply reference and reconstructing the RMS (root mean square) value of the power supply reference; and dimming the current signal provided to the semiconductor light source 20 according to the value of the power supply reference and to an external dimming signal PWM.

In particular, the step of driving the switching component M10 is synchronized with the power supply reference by the synchronization block 13.

An embodiment of a converter of the step-down type has been obtained, being suitable for a highly efficient conversion of a standard AC mains voltage to a voltage signal suitable to properly drive a semiconductor light source 20, in particular comprising LEDs, namely one or several LEDs in series.

The converter 10 according to an embodiment of the present disclosure contains a reduced number of external components and is fully protected from overvoltages coming from the AC voltage mains or from its assembly/fabrication process. The converter 10 works with a high efficiency and is able to dim the current on the output terminal OUT, which is supplied to the semiconductor light source 20, according to the AC mains voltage.

Moreover, the lighting apparatus 100 is suitable to be driven by an external light dimmer. In particular, the dimming block 18 and the peak detection block 19 allow a continuous lightning during the dimming operation, the dimming of the current on the output terminal OUT, which is supplied to the semiconductor light source 20, being in the range of approximately 10-100%.

It is also respectfully remarked that the lighting apparatus 100 is compatible with the existing AC sockets for the lighting applications, an embodiment of the proposed converter 10 having been designed with focus on the quality of the regulation and efficiency, minimum size and cost of the apparatus as a whole. Moreover, an embodiment of the converter 10 works with a standard 100V-240V AC supply.

According to an embodiment of the disclosure, no big nor expensive components, such as fly-back transformer or input AC filter or optocoupler, have been used.

Also according to an embodiment of the disclosure, the gate driver block 12, acting as an internal pre-regulator, is synchronized with the AC voltage, thanks to the synchronization block 13.

Finally, thanks to the protection block 14 and to the fuse component F10, the converter 10 according to an embodiment of the present disclosure is fully protected.

An embodiment of a enhanced lighting apparatus has been also provided, which uses semiconductor light sources, namely LEDs, properly supplied by a converter of the step-down type, and thus saves energy and decreases the cost of the final apparatus, also from the user point of view.

The converter according to an embodiment of the present disclosure is able to convert the AC mains voltage with a high efficiency to the voltage needed for supplying semiconductor light sources, namely LEDs. In particular, the input AC mains voltage is reduced by a switching pre-regulator input block (for example 1/10 of the AC mains maximum voltage to reduce the relatively large ratio between input and output voltages), this reduced voltage being used as input voltage for a step-down block. The pre-regulator input block comprises a switching mechanism which operates with a variable phase. The phase changes according the output load applied to the output terminal OUT, a voltage value at the second input node VPREREG downstream the pre-regulator input block, and the input AC mains voltage amplitude, i.e., the RMS value obtained by the peak detection block is starting from the voltage at the first input node VIN.

An embodiment is very flexible in terms of the output voltage for a standard LED or several LEDs connected in series, in particular fitting the 7 W power requirement of the market for the traditional bulbs replacement. According to an embodiment of the disclosure, there is no need of a big and expensive element such as a transformer or large inductor or optocoupler or rectifier bridge. Finally, an embodiment of the system in package integration allows using a minimum number of external components to reach a small price of the apparatus as a whole.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A voltage converter for supplying a semiconductor light source, comprising:

at least an input terminal coupled to a power supply reference;

an output terminal providing a current signal to said semiconductor light source;

a voltage reference;

at least a step-down block inserted between a switching node and to said output terminal and coupled to said voltage reference; and an input block coupled to said input terminal, as well as to a first input node and to a first output node of a control circuit, in turn coupled to said switching node and to said voltage reference;

wherein said input block is a pre-regulator input block and includes at least a switching component coupled to said input terminal and to a capacitive block, in turn inserted between a second input node of said control circuit and said voltage reference, said switching component having a control terminal coupled to said first output node; and wherein said control circuit further includes a supplying pre-regulation block which is directly coupled to a third input node and is also coupled to said first input node by means of a regulation diode, said first input node being also coupled to said voltage reference by means of a regulation resistor, said supplying pre-regulation block stabilizing a voltage value at said first input node when a voltage value on said second input node coming from said pre-regulator input block is under a predefined first threshold value, while, when said voltage value on said second input node is higher than said predefined first threshold value, said supplying pre-regulation block cuts a supplying from said first input node and switches a supply path of said control circuit to said second input node.

2. The voltage converter according to claim 1, wherein said control circuit further comprises a gate driver block coupled to said first output node as well to said first input node and able to drive said control terminal of said switching component in such a way that said voltage value in absolute value on said second input node is all the time between a second and a third predetermined threshold values.

3. The voltage converter according to claim 2, wherein said control circuit further comprises a synchronization block coupled to said gate driver block and synchronizing the latter with said supply voltage reference to optimize the current consumption.

4. The voltage converter according to claim 3, wherein said pre-regulator input block further comprises a fuse component inserted between said input terminal and said switching component and having a control terminal coupled to a second output node of said control circuit.

5. The voltage converter according to claim 4, wherein said control circuit further comprises a protection block coupled to said second output node of said control circuit and able to drive said fuse component of said pre-regulator input block to protect said semiconductor light source coupled to said voltage converter as well as an user thereof from high voltage values of said supply voltage reference, said protection block being able to detect any failure on said supply voltage reference during its normal working or during the assembly/manufacturing of said voltage converter.

6. The voltage converter according to claim 2, wherein said control circuit further comprises a step-down driver block coupled to said second input node and to said switching node of said step-down block and able to convert said voltage value on said second input node, which has a big ripple and comes from said pre-regulator input block to a voltage value on said switching node, which has a very low ripple and is suitable to be applied to said step-down block for the supplying of said semiconductor light source.

7. The voltage converter according to claim 6, wherein said step-down driver block has a high value switching frequency, for example equal to 1.8 Mhz.

8. The voltage converter according to claim 6, wherein said step-down driver block has an input terminal coupled to a logic block, in turn coupled to a locking block, said logic block driving said step-down driver block according to an internal state-machine to guarantee a proper operation of said control circuit, and said locking block stopping the operation of said control circuit when a voltage value being detected on a third input node of said control circuit is under a lockout voltage value.

9. The voltage converter according to claim 8, wherein said control circuit further comprises a dimming block coupled to a fourth input node of said control circuit and to a peak detection block, in turn coupled to said first input node of said control circuit, said peak detection block detecting peak voltage values on said supply voltage reference by detecting a voltage value on said first input node, in turn coupled to said input terminal of the converter and reconstructing the RMS or Root mean square value of said supply voltage reference, providing it to said dimming block, which works with the information coming from said peak detection block and from said fourth input node.

10. The voltage converter according to claim 1, wherein said control circuit is integrated in one single chip, the whole voltage converter being a system-in-package.

11. Voltage converter according to claim 10, further comprising at least one power device also integrated in said one single chip.

12. A method for supplying a semiconductor light source, the method comprising:

preregulating a power supply reference into a preregulated voltage signal by means of a capacitive block configured to decrease the power supply reference voltage to said preregulated voltage signal;

converting said preregulated voltage signal, which has a ripple, into a switching voltage which has less ripple and is suitable to be applied to a step-down block for the supplying of said semiconductor light source; and feeding back said preregulated voltage signal by suitably driving the switching on of a switching component coupled to said capacitive block.

13. The method according to claim 12, further comprising a step of cutting the supplying from said power supply reference when said pre-regulated voltage signal is higher than a predefined first threshold value and switching the supply path in such a way to use said pre-regulated voltage signal.

14. The method according to claim 13, further comprising a step of driving said switching component in such a way that the voltage value in absolute value of said pre-regulated voltage signal is between a second and a third predetermined threshold values.

15. The method according to claim 14, wherein said step of driving said switching component is synchronized with said power supply reference.

16. The method according to claim 13, further comprising a step of dimming said current signal provided to said semiconductor light source according to the value of said power supply reference and to an external dimming signal.

17. A converter, comprising:

at least one input node configured to receive an AC power signal;

at least one output node configured to provide an output power signal;

a first regulator coupled to the at least one input node and configured to convert the AC power signal into an intermediate power signal having a first voltage level having a first magnitude in response to the AC power signal and a feedback signal;

a second regulator coupled to the at least one output node and to the first regulator and configured to convert the intermediate power signal into the output power signal having a second voltage level having a second magnitude that is lower than the first magnitude; and a feedback circuit coupled to the output node through a load and configured to provide the feedback signal to the first regulator.

18. The converter of claim 17 wherein the first regulator comprises:

a switch having a first node coupled to the at least one input node and having a second node; and at least one capacitor coupled to the switch and configured to provide the intermediate power signal.

19. The converter of claim 17 wherein the first regulator comprises:

a switch having a first node coupled to the at least one input node and having a second node; and at least one capacitor coupled to the switch and configured to provide the intermediate power signal.

20. The converter of claim 17, wherein the first regulator comprises:

a switch component having a first node coupled to the at least one input node and having a second node; and at least one capacitor coupled to the switch component and configured to provide the intermediate power signal; and a synchronizer operable to cause the switch component to switch synchronously with the AC power signal.

21. The converter of claim 17, wherein the first regulator comprises:

a switch component having a first node coupled to the at least one input node and having a second node; and at least one capacitor coupled to the switch component and configured to provide the intermediate power signal; and a synchronizer operable to cause the switch component to turn on only in response to an instantaneous voltage level of the AC power signal being greater than a threshold.

22. The converter of claim 17, wherein the first regulator comprises:

a switch component having a first node coupled to the at least one input node and having a second node; and at least one capacitor coupled to the switch component and configured to provide the intermediate power signal; and a synchronizer configured to cause the switch component to turn on only in response to an instantaneous voltage level of the AC power signal having a magnitude that is greater than a threshold.

23. The converter of claim 17, wherein the first regulator comprises:

a switch component having a first node coupled to the at least one input node and having a second node; and at least one capacitor coupled to the switch component and configured to provide the intermediate power signal; and a synchronizer configured to cause the switch component to turn on only in response to an instantaneous voltage level of the AC power signal being within a range.

24. The converter of claim 17, wherein the first regulator comprises:

a switch component having a first node coupled to the at least one input node and having a second node; and at least one capacitor coupled to the switch component and configured to provide the intermediate power signal; and a synchronizer configured to cause the switch component to turn on only in response to an instantaneous voltage level of the AC power signal having a magnitude that is within a range.

25. The converter of claim 17 wherein the second regulator comprises a buck converter.

26. The converter of claim 17 wherein the second regulator comprises a pulse width modulated buck converter.

27. The converter of claim 17, further comprising:

an integrated circuit die; and wherein the input node, output node, first regulator, and second regulator are disposed on the die.

28. The converter of claim 17, further comprising a sense circuit that, in response to the intermediate power signal having a voltage that is below a threshold, is configured to couple the AC power signal to the second regulator and to cause the second regulator to generate the output power signal from the AC power signal.

29. The converter of claim 17, further comprising a dimming circuit coupled to the second regulator and configured to adjust the second voltage level.

30. The converter of claim 17, further comprising a fuse coupled between the input node and the first regulator.

31. The converter of claim 17 wherein the output power signal comprises a DC power signal.

32. A system, comprising:

at least one load; and a converter, comprising:

at least one input node configured to receive an AC power signal;

at least one output node coupled to the at least one load;

a first regulator coupled to the at least one input node and configured to convert the AC power signal into an intermediate power signal having a first voltage level in response to the AC power signal and a feedback signal;

a second regulator coupled to the at least one output node and to the first regulator, configured to convert the intermediate power signal into an output power signal having a second voltage level that is lower than the first voltage level, and operable to provide the output power signal to the output node; and a feedback circuit coupled to the output node through a load and configured to provide the feedback signal to the first regulator.

33. The system of claim 32 wherein the at least one load comprises at least one LED.

34. The system of claim 32 wherein the at least one load comprises multiple loads coupled in series.

35. The system of claim 32 wherein the at least one load comprises multiple loads coupled in parallel.

36. The system of claim 32 wherein:

at least one component of the converter is disposed on an integrated circuit; and at least one component of the converter is disposed external to the integrated circuit die.

37. The system of claim 32 wherein the converter is disposed on an integrated circuit.

* * * * *